(12) United States Patent
de Jong et al.

(10) Patent No.: US 6,865,607 B1
(45) Date of Patent: Mar. 8, 2005

(54) PLUGGABLE CHANNELS

(75) Inventors: Stephen Peter de Jong, Bellevue, WA (US); Caleb L. Doise, Bellevue, WA (US); Jonathan C. Hawkins, Seattle, WA (US); Gopala Krishna R. Kakivaya, Sammamish, WA (US); Petrus L. Obermeyer, Bothell, WA (US); Manish S. Prabhu, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 804 days.

(21) Appl. No.: 09/894,086

(22) Filed: Jun. 28, 2001

(51) Int. Cl.[7] .............................................. G06F 15/16
(52) U.S. Cl. ........................ 709/228; 709/202; 709/203; 709/227; 713/201
(58) Field of Search ................................. 709/200–203, 709/227–230; 713/200–201, 163; 370/329, 341, 431, 538, 462–463

(56) References Cited

U.S. PATENT DOCUMENTS

| | | | |
|---|---|---|---|
| 5,659,701 A | | 8/1997 | Amit et al. |
| 5,687,373 A | | 11/1997 | Holmes et al. ............. 719/328 |
| 5,748,897 A | * | 5/1998 | Katiyar ....................... 709/227 |
| 5,758,186 A | * | 5/1998 | Hamilton et al. ........... 709/203 |
| 5,886,988 A | * | 3/1999 | Yun et al. .................... 370/329 |
| 5,949,769 A | * | 9/1999 | Davidson et al. .......... 370/329 |
| 6,070,213 A | * | 5/2000 | Giordano .................... 370/431 |
| 6,108,715 A | | 8/2000 | Leach et al. |
| 6,343,321 B2 | * | 1/2002 | Patki et al. .................. 709/227 |
| 6,378,002 B1 | | 4/2002 | Brobst et al. |
| 6,404,776 B1 | * | 6/2002 | Voois et al. ................. 370/538 |
| 6,567,861 B1 | | 5/2003 | Kasichainula et al. |
| 6,601,072 B1 | | 7/2003 | Gerken, III |
| 6,639,904 B1 | * | 10/2003 | Boyer et al. ................ 370/329 |
| 6,671,810 B1 | * | 12/2003 | Jardin ......................... 713/201 |
| 6,772,335 B2 | * | 8/2004 | Curtis et al. ................ 713/163 |

OTHER PUBLICATIONS

Wilhelm Hasselbring, "Information System Integration", Communications of the ACM, vol. 43, No. 6, p. 33–38, no date.

Mark Allman. An Evaluation of XML–RPC. ACM SIGMETRICS Performance Evaluation Review, vol. 30 Issue 4, pp. 2–11, 2003.

C.–C. Chang. REXDC–a Remote Execution Mechanism. Symposium Proceedings on Communications Architectures and Protocols, pp. 106–115, 1989.

T. Harrision, D. Levine, and D. Schmidt. The Design and Performane of a Real–time CORBA Event Service. In Proceedings of OOPLSA, 1997. 20 pages.

Mark Evered. Opsis: a Distributed Object Architecture Based on Bracket Capabilities. Proceedings of the 40th International Conference on Tools Pacific: Objects for Internet, mobile, and embedded applications, vol. 10, pp. 63–70, 2002.

* cited by examiner

*Primary Examiner*—Bharat Barot
(74) *Attorney, Agent, or Firm*—Microsoft Corporation Amin & Turocy, LLP

(57) ABSTRACT

A system and method for providing a pluggable channel that can be employed to customize data communications associated with a remote method call is provided. The system includes a pluggable channel that can interact with sinks (e.g., message sinks, security sinks, transports sinks) that implement object-oriented interfaces that can be employed by a distributed object system. The system also includes a selector that can select and associate sinks with the pluggable channel, which facilitates providing a customized, pluggable channel on a per proxy basis.

42 Claims, 14 Drawing Sheets

Prior Art Fig. 6

PLUGGABLE CHANNELS

TECHNICAL FIELD

The present invention relates generally to remote method calling and more particularly, to a system that facilitates customizing the techniques of bundling up call parameters and/or return parameters, securing them and transporting them to and/or from a remote location.

BACKGROUND OF THE INVENTION

Conventional distributed object systems may have built-in support for the operations involved in parameter marshalling, which is the packaging of the parameters (call and return) of method calls made on remote objects. Typically, such built-in parameter marshalling is not customizable. Similarly, conventional distributed object systems may have built-in support for operations involved in parameter transporting, which is the transporting of the parameters to and/or from the remote end-point. Again, such built-in parameter transporting is typically not customizable. The two steps (e.g., parameter marshalling, parameter transporting) may be combined in conventional systems into a single entity, sometimes referred to as a channel, which is similarly not customizable. Thus, conventional systems have channels where the protocol payload format and the protocol transport are fixed, which leads to constraints and inflexibility. For example, if a distributed object system supports a first protocol via its channel, and a user of the distributed object system desires to employ a second protocol, the user may not be able to employ the second protocol due to the inflexibility of the conventional system.

In distributed object systems, a user application typically has a local representative or proxy to a remote object, where the remote object is often referred to as the server and/or server object. The distributed object system infrastructure typically intercepts method calls made on the proxy, and, in collaboration with infrastructure code delivers the call and parameters associated with the call from the proxy to the server. Similarly, results of the invocation of the call on the server are propagated by the infrastructure from the server back to the proxy, so that to the user it appears that the call executed locally.

Thus, processing involved in remoting a call made on a proxy includes serializing parameters (which may reference objects holding state on the client) associated with the method call. Such serialization is typically performed by a formatter. Serialization involves writing the state information of parameters and/or objects to a stream that may be read by a formatter on a server so that the parameters and/or objects can be recreated on the server side. Similarly, serialization involves writing the state information of return parameters and/or objects to a stream that may be read by a formatter on the client so that the return parameters and/or objects can be recreated back on the client side. Formatters also typically perform the inverse operation of deserialization. The formatters dictate the format in which the parameters and/or objects and their associated state are written to the stream. For example, a first formatter may employ a binary format while a second formatter may employ an XML format to represent the types of the parameters and/or objects and their associated state. Conventionally, formatters are not selectable, pluggable or customizable and thus conventional systems suffer from problems associated with inflexibility (e.g., inability to interact with new protocol formats).

The processing involved in remoting a call may further include securing the communication. A server may require different levels of identification (e.g., anonymous, identify, impersonate and delegate) and/or may choose different levels of payload security (e.g., integrity (signatures), privacy (encryption)). Conventionally, code associated with securing the communication was provided with the infrastructure and was not accessible, customizable, selectable and/or pluggable by a user of the infrastructure. Thus, updates to security code may have taken an unacceptably long period of time resulting in systems being vulnerable to attackers who had compromised the original security code. Thus, conventional systems suffered further from problems associated with inflexibility and inextensibility.

The processing involved in remoting a call further includes transporting the formatted, secured payload (e.g., serialized parameters and/or objects and state) between the client and the server. Different transports may be appropriate for different purposes. For example, typical transports include Hypertext Transport Protocol HTTP (e.g., for crossing firewalls), Transmission Control Protocol TCP (e.g., for intranet), Simple Mail Transport Protocol SMTP (e.g., for disconnected scenarios) and Microsoft Message Queue MSMQ (e.g., for reliable operation). Conventionally, transporting is handled by an infrastructure and such transporting is not accessible, customizable, selectable and/or pluggable by a user of the infrastructure. Thus, the infrastructure suffers even further still from inflexibility problems (e.g., inability to interact with a new transport, inability to select a most appropriate transport).

Thus, there remains a need for an architecture and/or system that mitigates inflexibility problems associated with conventional systems that are not accessible, customizable, selectable and/or pluggable.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Channels can be employed to transport messages between applications across remoting boundaries (e.g., application domains, processes, machines). The boundaries may be crossed with both inbound and outbound data. Conventionally, channels are not pluggable. Thus, the present invention relates to a system and method that facilitates users exercising fine-grained control over actions including, but not limited to, parameter marshalling, parameter security processing and/or parameter transporting involved in making method calls in a distributed object system via pluggable channels. When employing the present invention, users can provide custom data communication components (e.g., formatters, security processors, transport independent sinks, transporters) on a per proxy basis and/or can dynamically and/or programmatically choose between such formatters, security processors, transporters and the like that are available to infrastructures supporting the present invention.

The custom data communication components (e.g., formatters, security processors, transporters, etc.) can be plugged into the architecture provided by the present invention. Thus, flexibility and customization improvements are provided over conventional systems. For example, if a distributed object system employing the architecture provided by the present invention supports a first protocol via its channel, and a user of the distributed object system desires to employ a second protocol, then the user can custom craft a protocol formatter to support the second protocol. Custom crafting the protocol formatter includes implementing an object-oriented interface that will be employed to access the custom crafted protocol formatter. Once the protocol formatter has been coded, including implementing the object-oriented interface, then the protocol formatter can be plugged into the architecture and the user may then employ the second protocol.

In one example of the present invention, applications that employ the architecture provided by the present invention may register objects that implement pre-defined object-oriented channel interfaces with the infrastructure. When a proxy is created, registered channels are examined to determine whether the registered channel desires to interact with (e.g., adapt, control) the communication link between the proxy and the server. A channel that desires to control the communication link may create a message sink object (referred to as a channel sink), which becomes associated with the proxy. When a call is made on the proxy, the channel sink is invoked and passed a message object. The message object encapsulates information (e.g., parameters, objects, state, arguments, environment variables, cookies, etc.) that is to be formatted, secured and transported.

The present invention then offers the channel sink the opportunity to select a formatter to employ to (de)serialize the message. The formatter may have been provided by the infrastructure, but the formatter may also be a custom formatter provided by a user or third party. Thus, the present invention provides pluggable channels that can be customized with formatters that are programmatically accessible to users, which mitigates inflexibility problems associated with conventional systems.

Similarly, the present invention offers a security sink an opportunity to select a security processor and offers a transport sink an opportunity to select a transporter. The security processor and the transporter are accessible to users of the security processor and the transporter, are customizable and may be plugged into a remoting architecture that supports the channel. Thus, the present invention provides further advantages, via increased flexibility, and thus further mitigates inflexibility problems associated with conventional systems. While formatters, security processor and transporters are described above it is to be appreciated that other data communication components may similarly be plugged into the pluggable channel provided in accordance with the present invention.

In accordance with an aspect of the present invention, a system that facilitates customizing a data communication associated with a remote method call is provided. The system includes a pluggable channel that interacts with one or more sinks and/or with a communication infrastructure. The system also includes a selector that can choose sinks to employ to perform processing associated with the data communication. The selector can also associate the sinks with the pluggable channel.

Another aspect of the present invention provides a system that facilitates adapting a communication associated with a remote method call in a distributed object environment. The system includes a customizable formatter that formats data associated with a method call made on a remote object, where the method call is intercepted by the distributed object system and where the customizable formatter may be plugged into a pluggable channel. The system also includes a customizable security processor adapted to perform security processing on data associated with the method call made on the remote object, where the customizable security processor may be plugged into the pluggable channel. The system also includes a customizable transporter adapted to transport data associated with the method call made on the remote object between a caller and a callee, where the customizable transporter may be plugged into the pluggable channel. The system also includes a selector adapted to facilitate choosing at least one of a customizable formatter, a customizable security processor and a customizable transporter to process data associated with the method call.

Another aspect of the present system provides a computer readable medium that contains computer executable components of a system that facilitates customizing a component to component communication associated with a remote method call in a distributed object environment. The components include a pluggable channel component that interacts with one or more sink components and the distributed object environment. The components also include a selector component that chooses sink components to associate with the computer communication and which associates the one or more sink components with the pluggable channel component.

Yet another aspect of the present invention provides a method to facilitate customizing a channel. The method includes registering one or more pluggable channels, intercepting a method call made on a remoted object, determining whether one of the one or more registered channels desires to control data communications associated with the method call on the remoted object, creating a channel sink associated with the registered pluggable channel, choosing one or more data communication processes to associate with the channel sink, associating the one or more data communication processes with the channel sink and processing data associated with the method call on the remoted object through the one or more data communication processes associated with the channel sink.

Still yet another aspect of the present invention provides a computer readable medium containing computer executable instructions operable to perform a method to facilitate customizing a pluggable channel. The method includes registering one or more pluggable channels, intercepting a method call made on a remoted object, determining whether one of the one or more registered channels desires to control data communications associated with the method call on the remoted object, creating a channel sink associated with the registered pluggable channel, choosing one or more data communication processes to associate with the channel sink, associating the one or more data communication processes with the channel sink and processing data associated with the method call on the remoted object through the one or more data communication processes associated with the channel sink.

Another aspect of the present invention provides a system that facilitates pluggable channels. The system includes means for registering a channel; means for intercepting a method call made on a server object; means for determining whether a registered channel will control data communications associated with the method call on the server object; means for creating a channel sink; means for selecting data communication processes to associate with the channel sink; means for associating the data communication processes with the channel sink and means for processing data associated with the method call on the server object through the data communication processes associated with the channel sink.

Yet another aspect of the present invention provides a data packet adapted to be transmitted between two components. The data packet includes a first field adapted to hold information concerning a method call on a server object; a second field adapted to hold information concerning a channel sink associated with processing the information concerning the method call on the server object and a third field adapted to hold information concerning one or more data communication processes associated with the channel sink.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Prior Art

DETAILED DESCRIPTION OF THE INVENTION

Figure 1:
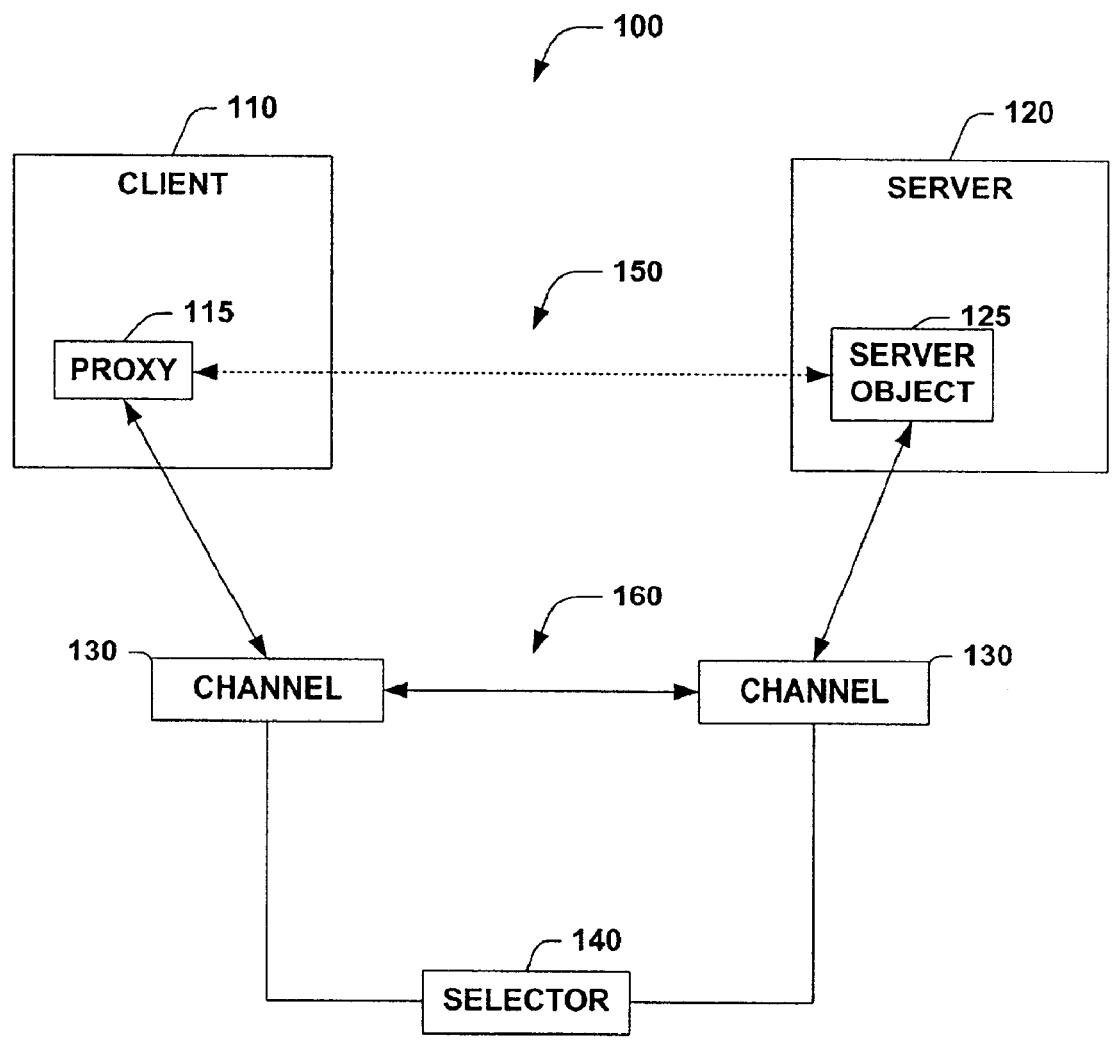
FIG. 1 is a schematic block diagram illustrating a system that facilitates users exercising fine-grained control over data communication processing involved in remote method calling (e.g., parameter marshalling, parameter security processing, parameter transporting) via a pluggable channel, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks may be employed.

FIG. 1 illustrates a system 100 that facilitates users exercising fine-grained control over data communication processing involved in remote method calling (e.g., parameter marshalling, parameter security processing, parameter transporting) via a pluggable channel 130. The system 100 includes a selector 140 that can be employed to select one or more sinks that can be employed to customize the pluggable channel 130. The sinks can include, but are not limited to, a channel sink, a format sink, a transport independent sink, a user sink, a security sink and a transport sink. The pluggable channel 130 facilitates customizing a communication associated with a remote method call on a server object 125. The server object 125 may be imaged by a proxy 115, where the proxy 115 is located on a client 110. Thus, while a logical communication 150 occurs between the proxy 115 and the server object 125, the pluggable channel 130 facilitates a custom physical communication 160. Conventionally, the channels employed in the physical communication between the client 110 and the server 120 are fixed and thus inflexible. But the present invention facilitates a flexible communication via the sinks that are pluggable into to the pluggable channel 130. The selector 140 may select between sinks including, but not limited to, sinks that are provided with a distributed object system and/or remoting infrastructure, user customized sinks, user programmed sinks and/or third party sinks, for example.

Figure 5:
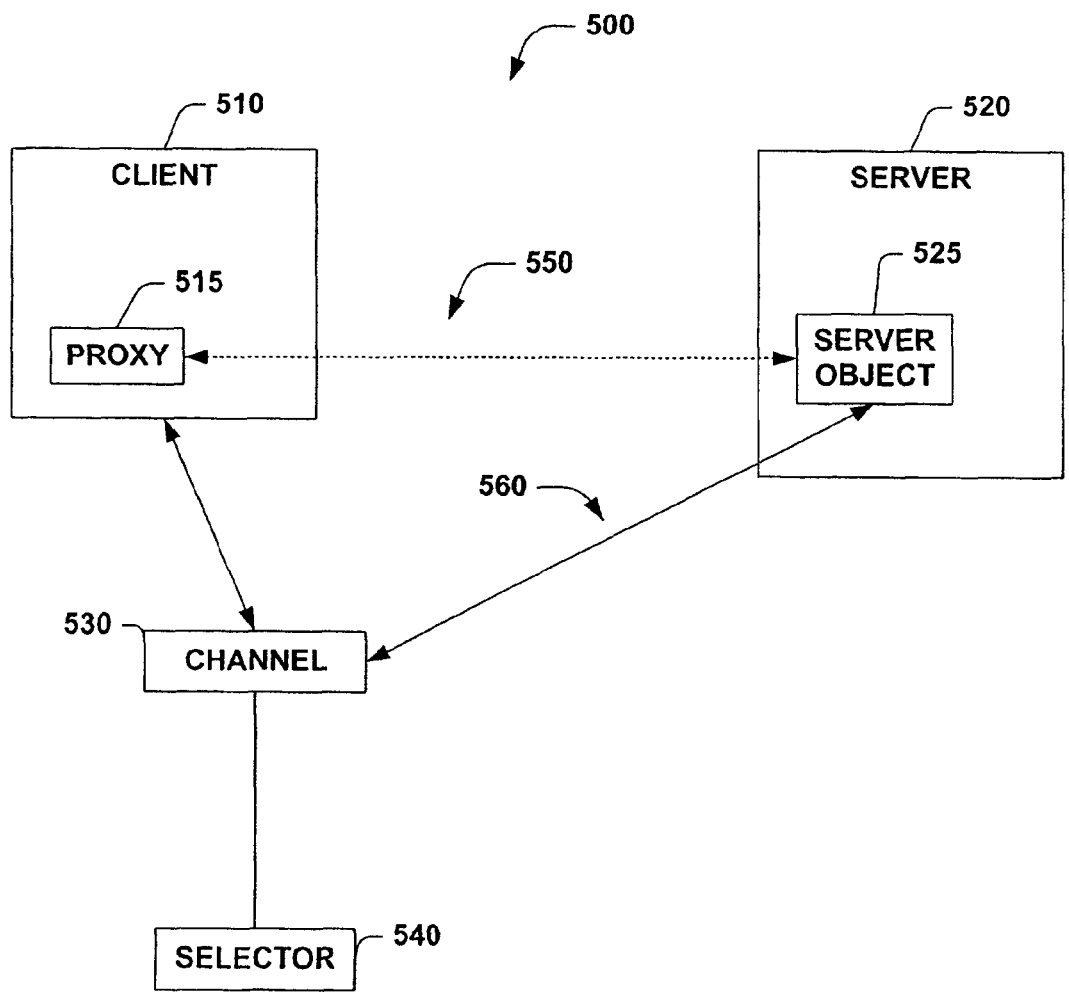
FIG. 5 is a schematic block diagram illustrating a system with a pluggable channel on the client side of a client server data communication associated with a remote method call, in accordance with an aspect of the present invention.

Although the system 100 illustrates two pluggable channels 130, it is to be appreciated that the present invention can be employed in accordance with an architecture where only one side of the client server conversation employs a pluggable channel (as illustrated in FIG. 5). A design obstacle that was overcome in connection with the system 100 relates to providing a powerful yet flexible mechanism for facilitating the selector 140 plugging sinks into the pluggable channel 130 in such a way that a proxy 115 and/or server object 125 does not have to be reprogrammed when a new sink is made available to the selector 140. Thus, the present invention defines object-oriented interfaces that sinks may implement to facilitate interactions with the proxy 115, the server object 125, a distributed object system and/or a remoting infrastructure, for example.

Thus, the present invention facilitates making a channel a pluggable channel, and thus opens up message processing associated with a remote method call (e.g., serializing, security, transporting), which provides advantages over conventional closed systems. Furthermore, the present invention facilitates providing such a pluggable channel on a per proxy basis, providing flexibility and customizability advantages over conventional systems.

Figure 2:
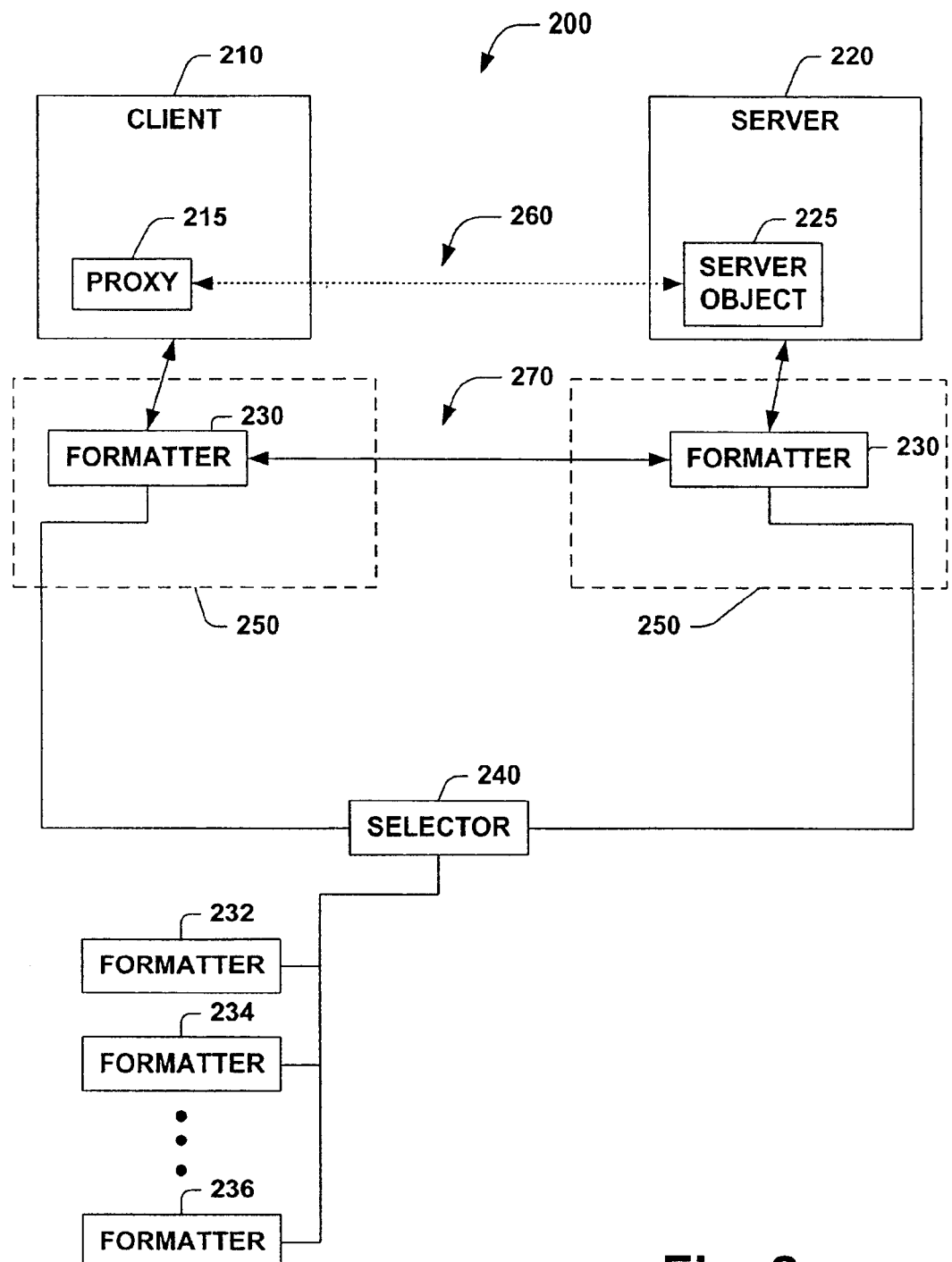
FIG. 2 is a schematic block diagram illustrating one example system that facilitates users exercising fine-grained control over data communication processing involved in remote method calling (e.g., parameter marshalling) via a pluggable channel, in accordance with an aspect of the present invention.

FIG. 2 illustrates one example system 200 that facilitates users exercising fine-grained control over data communication processing (e.g., parameter marshalling) involved in remote method calling via a pluggable channel 250. The system 200 provides a pluggable channel 250 that facilitates customizing communications between for example, a proxy 215 (located on a client 210) and a server object 225 (located on a server 220). The proxy 215 and the server object 225 carry on a logical conversation 260. However, the physical conversation 270 is carried on between the pluggable channels 250. Although the system 200 illustrates two pluggable channels 250, it is to be appreciated that the present invention can be employed in accordance with an architecture where only one side of the client server conversation employs a pluggable channel (as illustrated in FIG. 5).

The system 200 includes a selector 240 that can be employed to select a formatter 230 to associate with the pluggable channel 250. For example, the selector 240 may select a formatter from one or more available formatters (e.g., formatters 232 through 236). The formatter 230 can be employed to serialize and/or deserialize original message content into a stream that can be transported between the pluggable channels 250. Conventionally, the formatter 230 was fixed and thus neither customizable nor programmable. Thus, conventional systems suffered from problems associated with inflexibility. But the present invention, via the selector 240, facilitates plugging formatters including, but not limited to, a standard formatter, a user programmed formatter, a customized formatter and a third party formatter, for example, into the pluggable channel 250. Plugging the formatter 230 into the pluggable channel 250 may be achieved by methods including, but not limited to, establishing a pointer in the pluggable channel to the formatter 230, registering the formatter 230 with the pluggable channel 250, registering the formatter 230 with a distributed object system (see, e.g., FIG. 9), registering the formatter 230 with a remoting infrastructure, establishing an object reference to the format sink and manipulating a sink chain (see, e.g., FIG. 10), for example.

Figure 3:
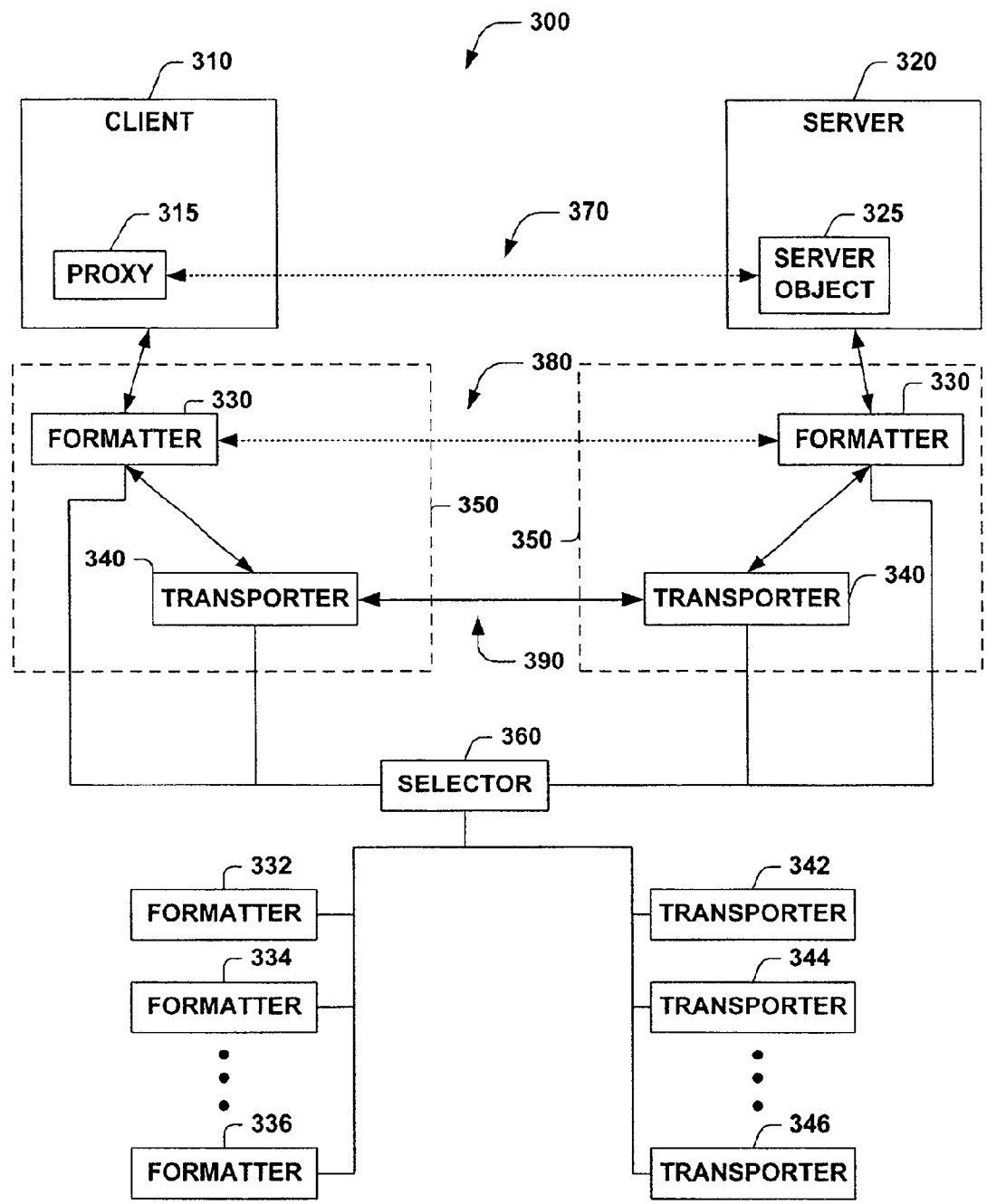
FIG. 3 is a schematic block diagram illustrating another example system that facilitates users exercising fine-grained control over data communication processing involved in remote method calling (e.g., parameter marshalling, parameter transporting) via a pluggable channel in accordance with an aspect of the present invention.

FIG. 3 illustrates an example system 300 that facilitates users exercising fine-grained control over data communication processing (e.g., parameter marshalling, parameter transporting) involved in remote method calling via a pluggable channel 350. The system 300 provides a pluggable channel 350 that facilitates customizing communications between for example, a proxy 315 (located on a client 310) and a server object 325 (located on a server 320). The proxy 315 and the server object 325 carry on a logical conversation 370. Similarly, formatters 330 carry on a logical conversation 380. However, the physical conversation 390 is carried on between the pluggable channels 350. Although the system 300 illustrates two pluggable channels 350, it is to be appreciated that the present invention can be employed in accordance with an architecture where only one side of the client server conversation employs a pluggable channel (as illustrated in FIG. 5).

The system 300 includes a selector 360 that can be employed to select a formatter 330 to associate with the pluggable channels 350. For example, the selector 360 may select a formatter from one or more available formatters (e.g., formatters 332 through 336). The formatter 330 can be employed to serialize and/or deserialize original message content into a stream that can be transported between the pluggable channels 350.

The selector 360 may also be employed to select a transporter 340 to associate with the pluggable channels 350. For example, the selector 360 may select a transporter from one or more available transporters (e.g., transporters 342 through 346). The transporter 340 can be employed to transmit and/or receive a stream between the pluggable channels 350. The stream may be sent, for example, across a network. Conventionally, the transporter 340 was fixed and thus neither customizable nor programmable. Thus, conventional systems suffered from problems associated with inflexibility. But the present invention, via the selector 360, facilitates plugging transporters including, but not limited to, a standard transporter, a user programmed transporter, a customized transporter and a third party transporter, for example, into the pluggable channel 350. Plugging the transporter 340 into the pluggable channel 350 may be achieved by methods including, but not limited to, establishing a pointer in the pluggable channel to the transporter 340, registering the transporter 340 with the pluggable channel 350, registering the transporter 340 with a distributed object system (see, e.g., FIG. 9), registering the transporter 340 with a remoting infrastructure, establishing an object reference to the transporter 340 and manipulating a sink chain (see, e.g., FIG. 10), for example.

Although FIG. 3 illustrates a pluggable channel 350 being customized with two message processing components (e.g., formatter 330, transporter 340), it is to be appreciated that the present invention facilitates customizing a pluggable channel with a greater or lesser number of message processing components.

Figure 4:
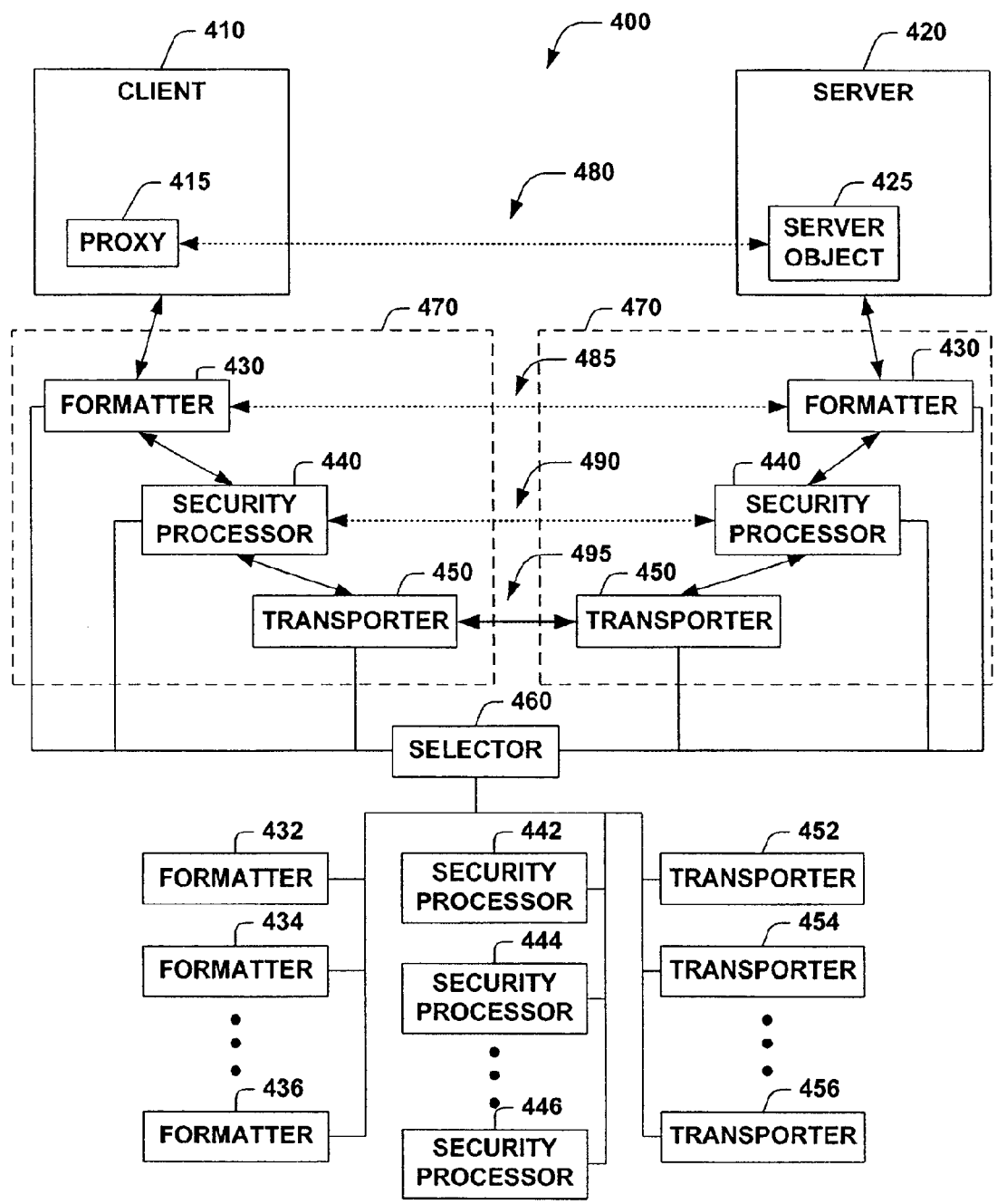
FIG. 4 is a schematic block diagram illustrating another example system that facilitates users exercising fine-grained control over data communication processing involved in remote method calling (e.g., parameter marshalling, parameter security processing, parameter transporting) via a pluggable channel in accordance with an aspect of the present invention.

Thus, FIG. 4 illustrates an example system 400 that facilitates users exercising fine-grained control over data communication processing (e.g., parameter marshalling, parameter security processing, parameter transporting) involved in remote method calling via a pluggable channel 470. The system 400 provides a pluggable channel 470 that facilitates customizing communications between for example, a proxy 415 (located on a client 410) and a server object 425 (located on a server 420). The proxy 415 and the server object 425 carry on a logical conversation 480. Similarly, formatters 430 carry on a logical conversation 485 and security processors 440 carry on a logical conversation 490. However, the physical conversation 495 is carried on between the pluggable channels 470 via transporters 450. Although the system 400 illustrates two pluggable channels 470, it is to be appreciated that the present invention can be employed in accordance with an architecture where only one side of the client server conversation employs a pluggable channel (as illustrated in FIG. 5). Furthermore, while three pluggable components are illustrated (e.g., a formatter, a security processor, a transporter), it is to be appreciated that the present invention can support a greater or lesser number of components that can be plugged into the channel processing associated with the present invention. The variety of pluggable components and the various architectures into which they may be plugged presented a design obstacle that was overcome by defining object-oriented interfaces that can be implemented by designers of pluggable components. The pre-defined object-oriented interfaces allow designers to "hook" their pluggable components into the architecture provided by the present invention without requiring clients, proxies, servers and/or server objects to be recoded when a new pluggable component is made available to the selector 460. Thus, flexibility advantages over conventional systems are achieved.

The system 400 includes a selector 460 that can be employed to select a formatter 430 to associate with the pluggable channels 470. For example, the selector 460 may select a formatter from one or more available formatters (e.g., formatters 432 through 436). The formatter 430 can be employed to serialize and/or deserialize original message content into a stream that can be transported between the pluggable channels 470.

The selector 460 may also be employed to select a transporter 450 to associate with the pluggable channels 470. For example, the selector 460 may select a transporter from one or more available transporters (e.g., transporters 452 through 456). The transporter 450 can be employed to transmit and/or receive a stream between the pluggable channels 470. The stream may be sent, for example, across a network.

The selector 460 may also be employed to select a security processor 440 to associate with the pluggable channels 470. For example, the selector 460 may select a security processor from one or more available security processors (e.g., security processors 442 through 446). The security processor 440 can be employed to secure messages between the pluggable channels 470.

Conventionally, the security processor 440 was fixed and thus neither customizable nor programmable. Thus, conventional systems suffered from problems associated with inflexibility. But the present invention, via the selector 460, facilitates plugging security processor including, but not limited to, a standard security processor, a user programmed security processor, a customized security processor and a third party security processor, for example, into the pluggable channel 470. Plugging the security processor 440 into the pluggable channel 470 may be achieved by methods including, but not limited to, establishing a pointer in the pluggable channel to the security processor 440, registering the security processor 440 with the pluggable channel 470, registering the security processor 440 with a distributed object system (see, e.g., FIG. 9), registering the security processor 440 with a remoting infrastructure, establishing an object reference to the security processor 440 and manipulating a sink chain (see, e.g., FIG. 10), for example.

FIG. 5 illustrates a system 500 where a pluggable channel 530 resides on the client 510 side of a client server data communication associated with a remote method call made on a server object 525 but where no pluggable channel resides on the server 520 side of the data communication. A logical conversation 550 occurs between the proxy 515 and the server object 525, but the physical conversation 560 occurs between the pluggable channel 530 and the server object 525. The pluggable channel 530 may be adapted by the selector 540 in a manner similar to that described in FIGS. 2 through 4 (e.g., adding format sinks, security sinks, transport sinks, etc).

Figure 6:
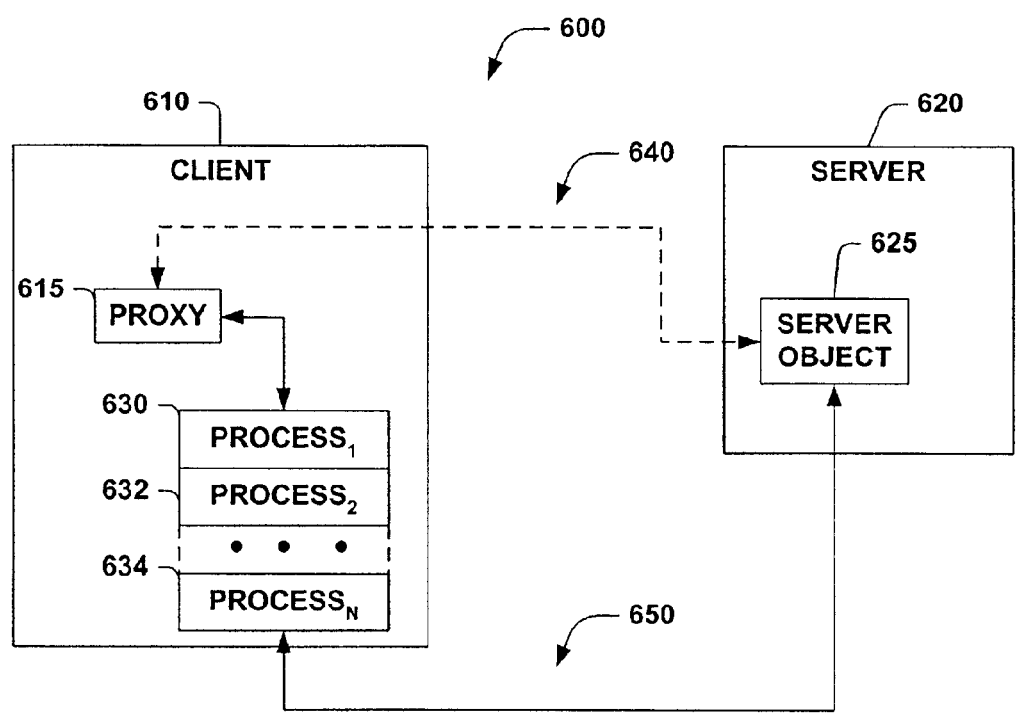
FIG. 6 is a schematic block diagram illustrating an inaccessible, inflexible, non-customizable, non-programmable, non-pluggable channel.

Prior Art FIG. 6 illustrates an inaccessible, inflexible, non-customizable, non-programmable, non-pluggable channel. In system 600, a proxy 615 residing on a client 610 carries on a logical conversation 640 with a server object 625 on a server 620. But the physical conversation 650 passes through a plurality of message processing processes (e.g., $PROCESS_1$ 630 through $PROCESS_N$ 634, N being an integer). Conventionally, the message processing processes (e.g., $PROCESS_1$ 630 through $PROCESS_N$ 634) were not accessible to programmers and thus systems like system 600 suffered from problems associated with inflexibility.

Figure 7:
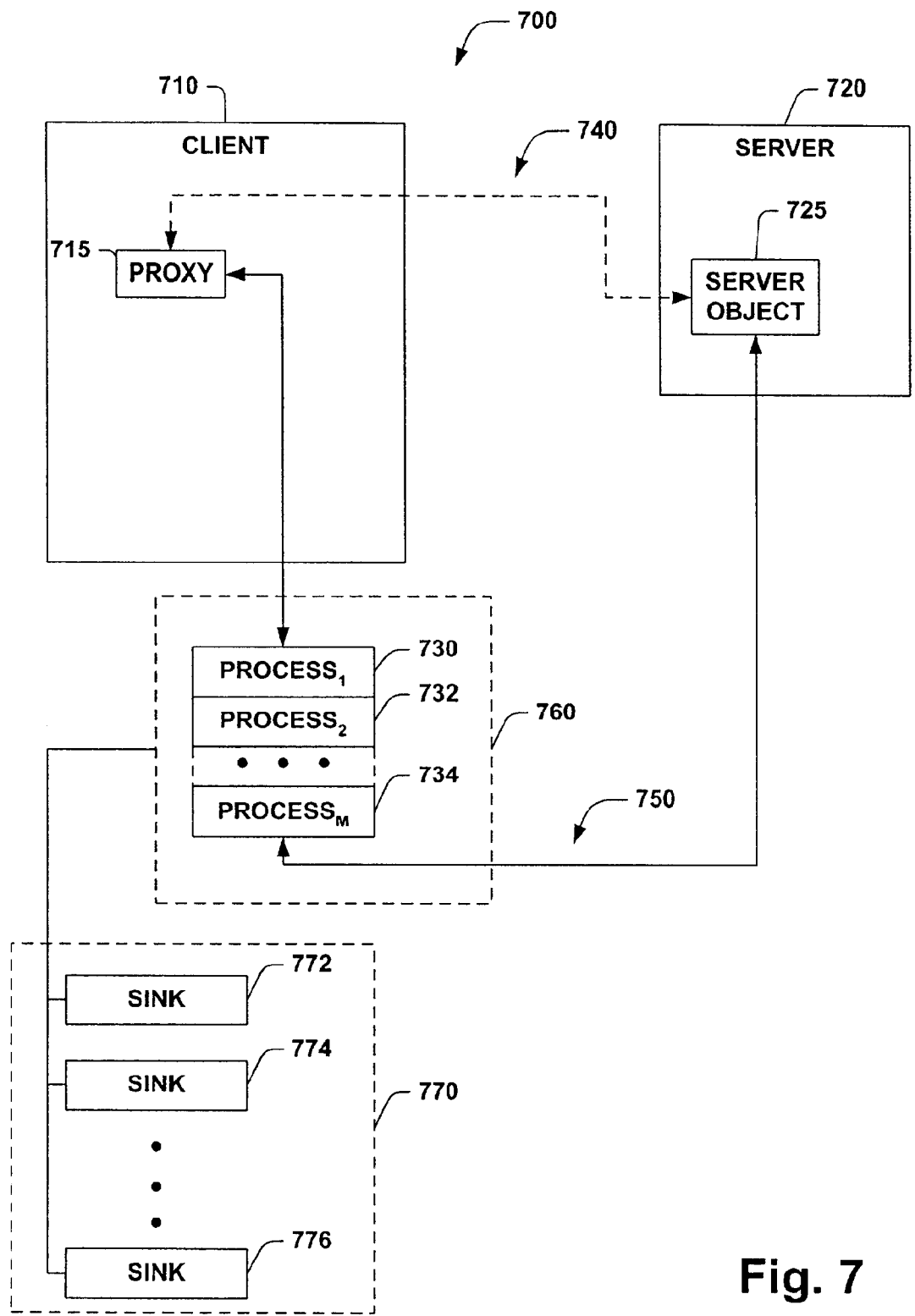
FIG. 7 is a schematic block diagram illustrating an accessible, flexible, customizable, programmable, pluggable channel, in accordance with an aspect of the present invention.

Thus, FIG. 7 illustrates an accessible, flexible, customizable, programmable, pluggable channel 760 that facilitates mitigating such inflexibility problems. In system 700, a proxy 715 residing on a client 710 carries on a logical conversation 740 with a server object 725 on a server 720. But the physical conversation 750 passes through a pluggable channel 760 that can include one or more message processing processes (e.g., $PROCESS_1$ 730 through $PROCESS_M$ 734, M being an integer), where the processes may be implemented by one or more sinks. Conventionally, the message processing processes (e.g., $PROCESS_1$ 730 through $PROCESS_M$ 734) were not accessible to programmers, but the present invention makes such message processing processes accessible to programmers and thus facilitates mitigating problems associated with inflexibility.

By way of illustration, the pluggable channel 760 may perform $PROCESS_1$ 730 (e.g., format processing that is performed by a formatting sink), $PROCESS_2$ 732 (e.g., security processing that is performed by a security sink) and $PROCESS_M$ 734 (e.g., transport processing that is performed by a transport sink). The format sink that performs $PROCESS_1$ 730, the security sink that performs $PROCESS_2$ 732 and the transport sink that performs $PROCESS_M$ 734 may have been selected from a pool 770 of available sinks (e.g., sinks 772 through 776). Given the variety of sinks—produced by a variety of designers—that are available to be associated with a pluggable channel (e.g., channel 760), one design challenge associated with the pluggable channel 760 was facilitating communications between the variety of sinks. Thus, pre-defined object-oriented interfaces were defined for sinks. Sinks that desire to interact with the pluggable channel 760, a remoting infrastructure and/or a distributed object environment associated with the present invention implement the pre-defined object-oriented interfaces to facilitate communicating with entities including, but not limited to, other sinks, a distributed object environment and a remoting infrastructure. By implementing the pre-defined object-oriented interfaces, sinks may be plugged into the pluggable channel 760, providing flexibility and extensibility advantages over conventional systems.

Figure 8:
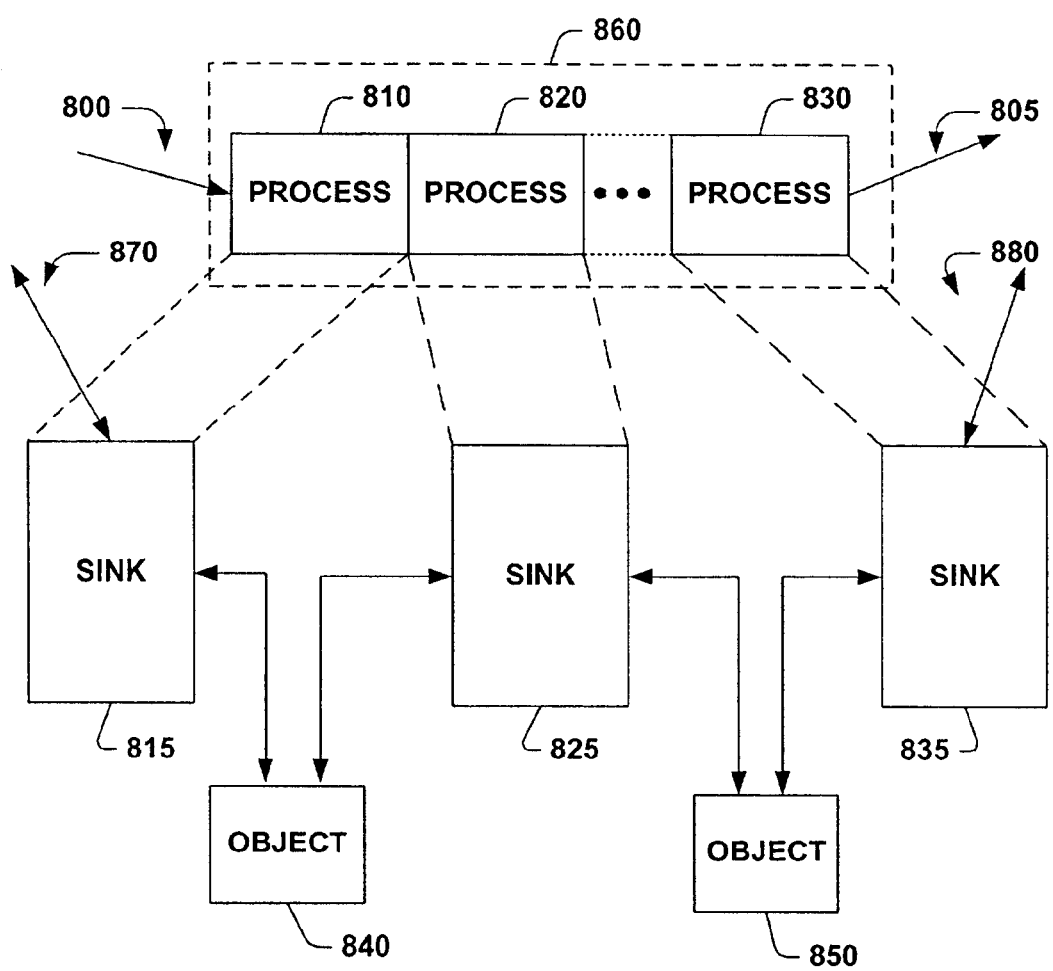
FIG. 8 is a schematic block diagram illustrating a message flow through a sink chain associated with a pluggable channel, in accordance with an aspect of the present invention.

FIG. 8 illustrates a message flow through a sink chain associated with a pluggable channel. Logically, an input 800 arrives at a channel 860 and is processed until an output 805 is produced. The channel 860 may perform one or more logical data communication processes (e.g., process 810, process 820 through process 830) in transforming the input 800 to the output 805. Physically, the channel 860 can include one or more sinks (e.g., format sink, security sink, transport sink) that perform the data communication processes. The present invention facilitates the sinks communicating with each other via objects by providing pre-defined classes and interfaces.

By way of illustration and not limitation, a first sink 815 may be part of a sink chain that includes sink 815, sink 825 and sink 835. The sink 815, being the first sink in the sink chain, may implement a first interface that facilitates receiving an input 870 from a message provider (e.g., remote method caller, distributed object system, remoting infrastructure). The sink 815 may expect on inbound processing that the input 870 is, for example, a call stack that will be provided to the sink 815 via a member method of the interface. On return processing, the sink 815 may provide return parameters on a stack via a member method of the interface. Similarly, sink 835, being the last sink in the sink chain, may implement a second interface that facilitates, on the outbound side, providing an output 880 to the consumer of the output of the sink chain (e.g., network, Internet, interprocess communication). The sink 835 may produce, for example, a stream that is sent on a network. On inbound processing, the sink 835 may receive, for example, a stream, and produce an object that can be passed to other sink chain sinks.

Sinks that are neither the first sink in a sink chain nor the last sink in a sink chain (e.g., sink 825) may similarly implement interfaces to facilitate interacting with other sinks. The sinks may communicate via one or more pre-defined objects. Providing the interface definitions and the communication object definitions facilitates programmers producing new sinks that will be pluggable into a channel. Thus, problems associated with inflexibility are mitigated.

In one example of the present invention, a formatting sink (e.g., sink 815) may do more than just serialize data received as the input 870. The sink 815 may create a message object 840 that contains both the serialized call data provided as the input 870 and other non-serialized data including, but not limited to, protocol headers, a channel name, a channel priority, and the like. Thus, the object 840 that is received as an input by the sink 825 may be employed to facilitate custom processing by the sink 825. For example, for a first message object 840, the sink 825 may examine the additional data added by the sink 815 and determine that a first type of security is desired for the message associated with the first object 840. But for a second message object 840, the sink 825 may examine the additional data added by the sink 815 and determine that a second type of security is desired for the message associated with the second object 840.

Thus, the logical progression of receiving an input 800 that is processed through the channel 860 until an output 805 is produced is opened up by the pluggable channels facilitated by the present invention, providing flexibility advantages over conventional systems. The flexibility of the pluggable channels is further enhanced by the existence of the pre-defined object oriented interfaces and inter-sink communication objects that facilitate user coding of new sinks that can be employed in a pluggable channel.

Figure 9:
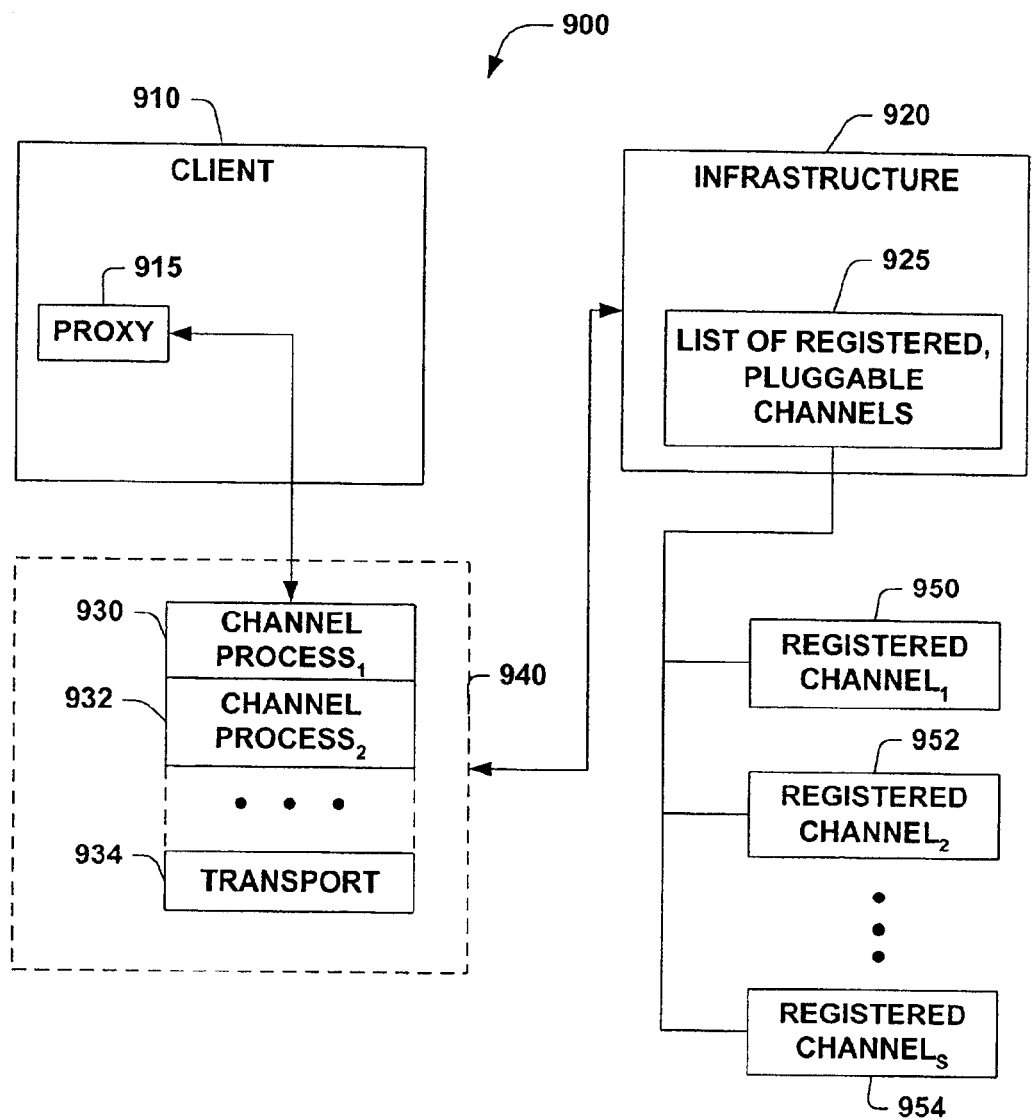
FIG. 9 is a schematic block diagram illustrating registered pluggable channels employed in accordance with an aspect of the present invention.

FIG. 9 illustrates a system 900 that employs a list 925 of registered pluggable channels that are available to be employed in accordance with the present invention. The system 900 facilitates associating a pluggable channel 940, which includes sinks operable to perform one or more channel processes (e.g., CHANNEL PROCESS₁ CHANNEL PROCESS₂ through a TRANSPORT process 934), with a proxy 915 on a per proxy basis. The list 925 may include identifiers associated with one or more registered channels (e.g., REGISTERED CHANNEL₁ 950 and REGISTERED CHANNEL₂ 952 through REGISTERED CHANNEL$_S$ 954, S being an integer). A channel can be registered in the list 925 of registered, pluggable channels in the infrastructure 920 if it implements pre-defined object-oriented interfaces that facilitate communication between a channel and the infrastructure 920.

Registering the channels facilitates providing a pluggable channel on a per proxy basis. By way of illustration and not limitation, when a proxy is created, the list 925 of registered pluggable channels is examined and pluggable channels registered in the list 925 are examined to determine whether they desire to adapt (e.g., customize, control) communications associated with the proxy. If a registered pluggable channel desires to adapt (e.g., control, customize) the communications associated with the proxy, then the registered pluggable channel is employed to select the set of channel processes (which include a transport sink as the last sink in the sink chain) that are associated with the proxy 915. The registered pluggable channel has information concerning the identity and order of sinks associated with the registered pluggable channel and the proxy 915 and thus can be employed to manage inter-sink communication.

While FIG. 9 describes a list 925 of registered pluggable channels it is to be appreciated that other data structures including, but not limited to a linked list, an array, a record, a table, a database, a hypercube, a stack, a heap and a file can be employed to store information associated with registered channels. It is to be similarly appreciated that although three processes and/or sinks are illustrated in association with the pluggable channel 940, that a greater or lesser number of processes and/or sinks may be employed in accordance with the present invention.

Figure 10:
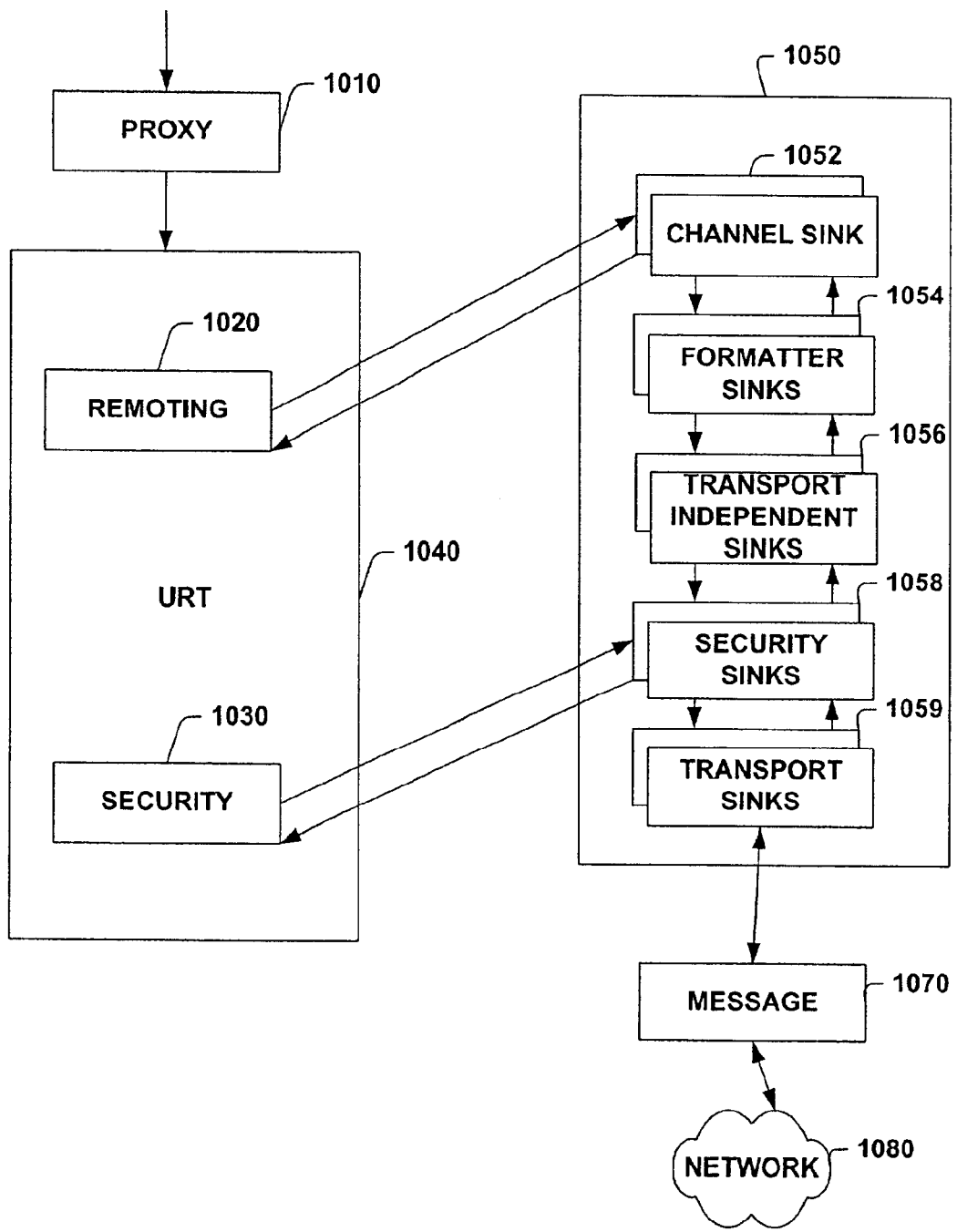
FIG. 10 is a schematic block diagram illustrating one example remoting channel sink in accordance with an aspect of the present invention.

FIG. 10 illustrates one example remoting channel sink. Channel sinks provide a plug-in point that facilitates access to the underlying messages flowing through a channel as well as the stream used by a transport mechanism to send a message 1070 to a remote object via a network 1080, for example. Sinks (e.g., a channel sink 1052, a formatter sink 1054, a transport independent sink 1056, a security sink 1058, a transport sink 1059) are linked together into a chain 1050.

In the outbound direction, data associated with a remote method call on a server object, where the server object is imaged by a proxy 1010, is passed by a remoting infrastructure 1020 to the first sink in the chain 1050. A registered channel has information concerning the identity and order of sinks in the sink chain 1050, and thus, the data is processed by sinks, until it arrives at the last sink in the sink chain 1050, the transport sink 1059. The transport sink 1059 then sends the message 1070 onto the network 1080. It is to be appreciated that the data associated with a remote method call on a server object may be passed in manners including, but not limited to, as one substantially complete packet and in partial packets.

In the inbound direction, the message 1070 may arrive from the network 1080 and be passed to the transport sink 1059. The message will then be processed by members of the sink chain 1050 until it emerges from the channel sink 1052 and is passed to the proxy 1010 via the remoting infrastructure 1020. It is to be appreciated that the message 1070 received in the inbound direction may arrive in formats including, but not limited to, as one substantially complete packet and in partial packets.

In one example of the present invention, channels may be divided into two sets of classes, one for the client side and one for the server side. Server-side channels may be registered when an application desires to host an object. Similarly, client-side channels may be registered in applications that desire to connect to remote objects (e.g., when a proxy is created).

Information concerning sink providers may be provided, for example, in a configuration file, providing a programmatic entry point for customizing a pluggable channel. For example, the configuration file provided below illustrates an entry in a channel configuration section of a configuration file that facilitates customizing a pluggable channel in one example of the present invention.

```
<configuration>
    <system.runtime.remoting>
        <channels>
            <channel id="http"
                type=
                   "System.Runtime.Remoting.Channels.Http.
                   HttpChannel, System.Runtime.Retmoting"/>
            <channel id="http server"
                type=
                   "System.Runtime.Remoting.Channels.Http.
                   HttpServerChannel,
                   System.Runtime.Remoting"/>
            <channel id="http client"
                type="System.Runtime.Remoting.ChannelsHttp.
                   HttpClientChannel,
                   System.Runtime.Remoting"/>
        </channels>
        <channelSinkProviders>
            <clientProviders>
                <formatter id="soap"
                    type="System.Runtime.Remoting.Channels.
                    SoapClientFormatterSinkProvider,
                    System.Runtime.Remoting"/>
            </clientProviders>
            <serverProviders>
                <formatter id="soap"
                    type="System.Runtime.Remoting.Channels.
                    SoapServerFormatterSinkProvider,
                    System.Runtime.Remoting"/>
                <provider id="ip filter"
                    type "IPFilter.IPFilterChannelSinkProvider,
                    IPFilterSink"/>
            </serverProviders>
        </channelSinkProviders>
    </system.runtime.remoting>
</configuration>
```

It is to be appreciated that the sample configuration file provided above illustrates a template for one example of the present invention and that individual client and/or service sections in an implemented configuration file would reference the sink providers they intend to employ.

A sink chain (e.g., sink chain 1050) may be responsible for transporting a message between a client and a server. Such sink chains are flexible in what is passed through the sink chain. For example, security sinks (e.g., security sink 1058) that desire to negotiate authentication before sending an actual serialized original message can hold onto the actual serialized original message, replace the content stream with their own security sink content and send it through the sink chain, where a transport sink (e.g., transport sink 1059) will transport it to the endpoint. On the return journey, the security sink 1058 can intercept the reply message and interact with a security infrastructure 1030. Thus a security sink at a client side can have a conversation with a security sink at a server side until the sinks arrive at a point where they are prepared to communicate the original content stream.

In one example of the present invention, the formatter sink 1054 implements a pre-defined object oriented formatter interface (e.g., IClientFormatterSink interface). Thus, the formatter interface can be employed as an entry point to the sink chain 1050. Similarly, the transport sink 1059 implements a pre-defined object oriented transport interface (e.g., IClientTransportSink interface). Thus, the formatter interface can be employed as an entry point to the last sink in the sink chain 1050. Other sinks (e.g., transport independent sinks 1056, the security sinks 1058) may also implement pre-defined object oriented interfaces to facilitate interacting with other sinks, a distributed object system, a remoting infrastructure 1020 and/or a security infrastructure 1030, for example.

Figure 11:
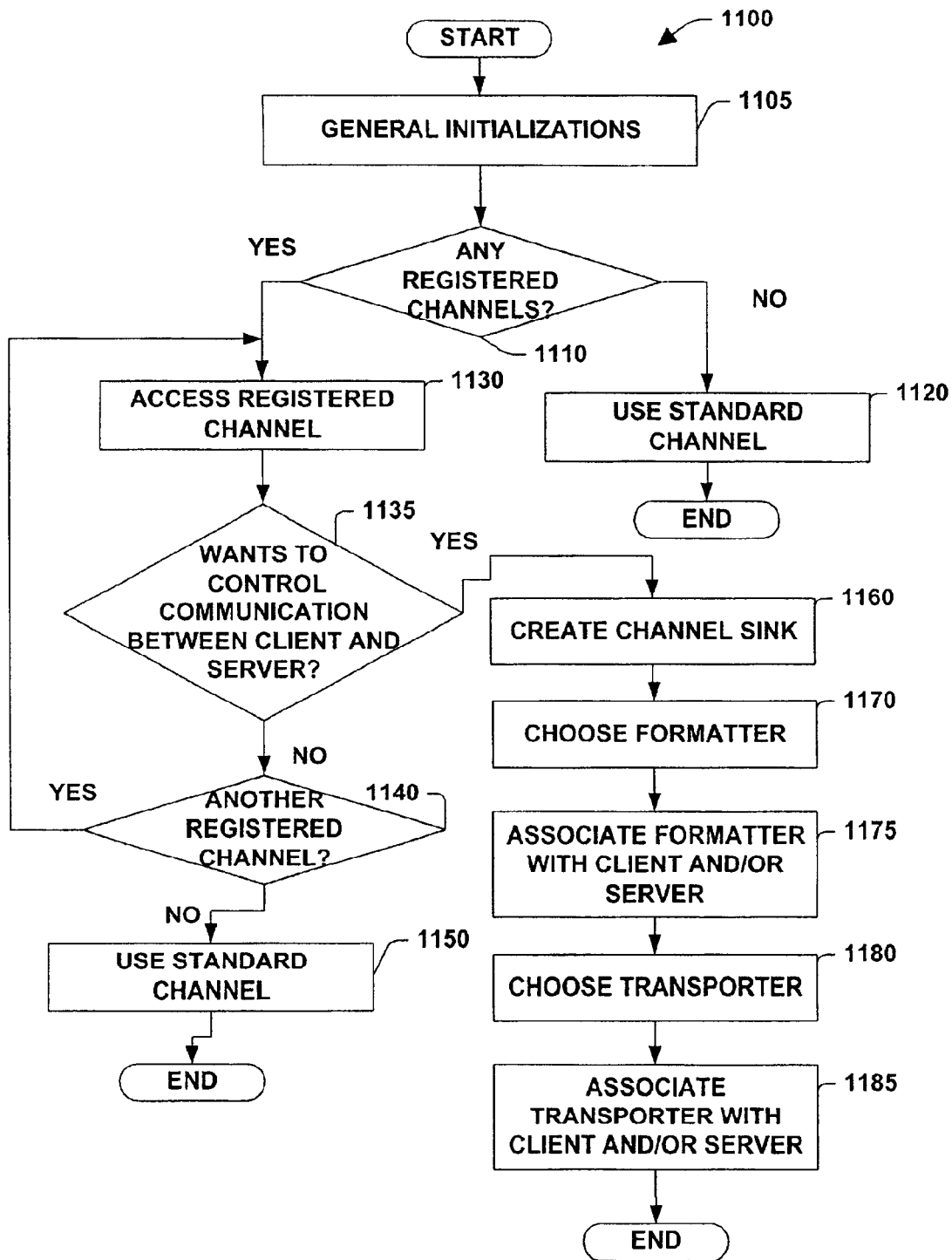
FIG. 11 is a flow chart illustrating a method for adapting a pluggable channel in accordance with an aspect of the present invention.
Figure 12:
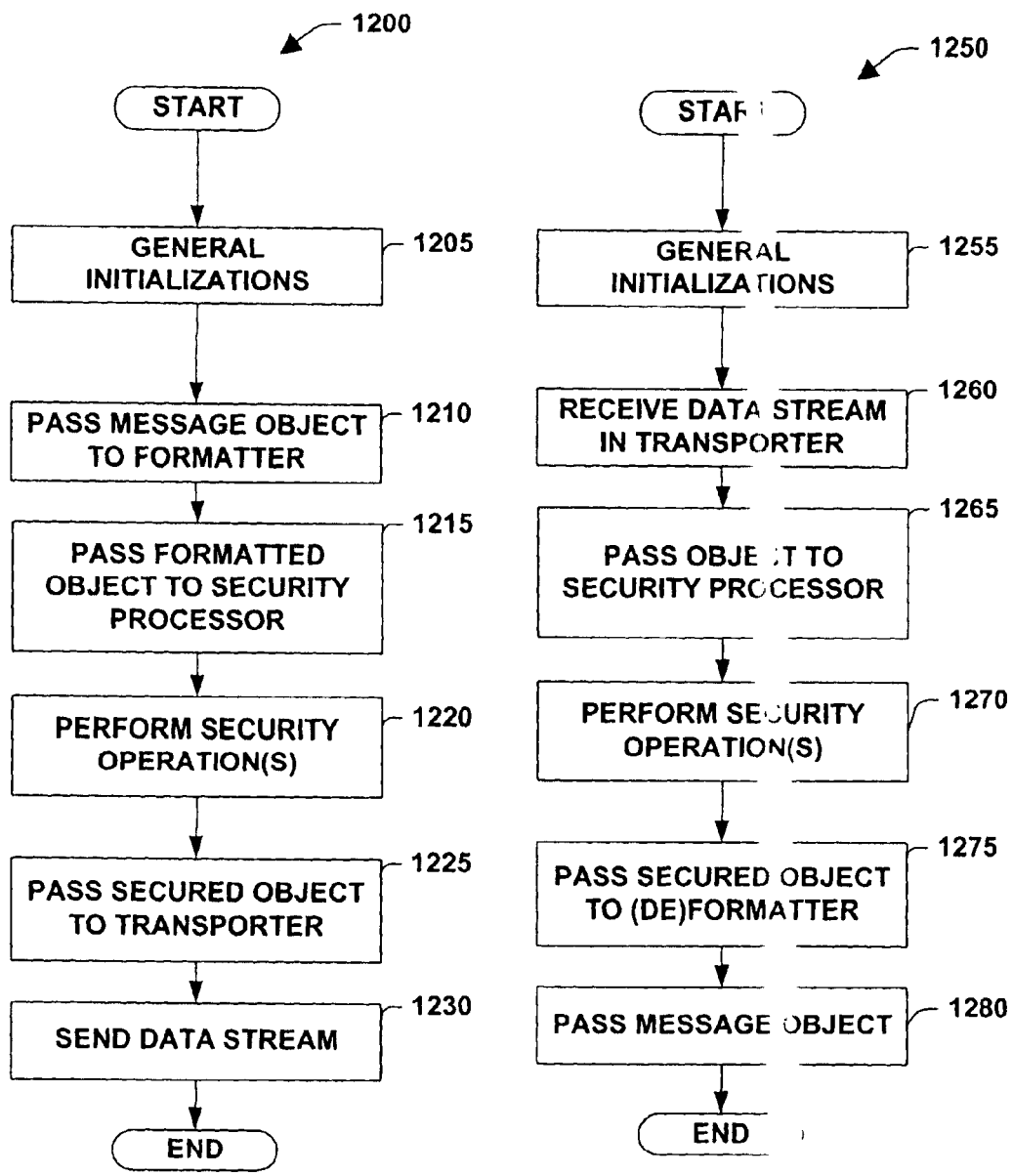
FIG. 12 is a flowchart illustrating methods for employing a pluggable channel in accordance with an aspect of the present invention.

In view of the exemplary systems shown and described above, methodologies that may be implemented in accordance with the present invention will be better appreciated with reference to the flow charts of FIGS. 11 and 12. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks maybe required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments. Furthermore, computer executable instructions operable to perform the methods described herein may be stored on computer readable media.

FIG. 11 is a flow chart illustrating a method 1100 for configuring a pluggable channel. When a proxy is created, the method 1100 may be initiated to determine whether a pluggable channel will be associated with the proxy.

At 1105, general initializations occur. Such initializations include, but are not limited to, allocating memory, establishing pointers, establishing data communications, acquiring resources, instantiating objects, finding a data structure that stores information identifying registered channels and setting initial values for variables.

At 1110, a determination is made concerning whether there are any registered pluggable channels to examine concerning adapting (e.g., customizing, controlling) message processing associated with the proxy. If the determination at 1110 is NO, then at 1120, standard components are plugged into the pluggable channel and the standard component laden pluggable channel is employed in processing associated with remote method calls associated with the proxy with which the pluggable channel is associated. If the determination at 1110 is YES, then at 1130, a registered channel is accessed. For example, a list of registered channels may be examined, and one of the registered channels in the list may be identified as being the target of the determination at 1135. While a list of registered pluggable channels is described in connection with 1130 through 1140, it is to be appreciated that other data structures including, but not limited to a linked list, an array, a record, a table, a database, a hypercube, a stack, a heap and a file can be employed to store information associated with registered channels.

At 1135 a determination is made concerning whether the registered channel that is currently being accessed desires to interact with (e.g., adapt, customize, control) communication associated with the proxy associated with initiating the method 1100. For example, one or more methods implemented in an object-oriented interface may be invoked on the registered pluggable channel that is currently being accessed to facilitate determining whether the registered pluggable channel desires to interact with the proxy. Inputs including, but not limited to the identity of the proxy, the type of the proxy, the identity of the server object imaged by the proxy and the class of the server object imaged by the proxy may be provided to the registered pluggable channel as inputs to facilitate determining whether the registered pluggable channel desires to interact with the proxy. If the determination at 1135 is NO, then at 1140 a determination is made concerning whether there is another registered pluggable channel to examine concerning interacting with the proxy. If the determination at 1140 is YES, then processing returns to 1130, otherwise, at 1150, standard components are plugged into the pluggable channel and the standard component laden pluggable channel is employed in processing associated with remote method calls associated with the proxy with which the pluggable channel is associated.

If the determination at 1135 was YES, that the registered pluggable channel being examined was interested in interacting with the proxy associated with initiating the method 1100, then processing proceeds to 1160. At 1160, a channel sink may be created. At 1170, the channel sink of 1160 may then be employed in choosing a formatter (e.g., a format sink) with which the registered pluggable channel is associated and thus which the registered pluggable channel desires to employ in its interactions with the proxy. At 1175, the chosen format sink is associated with a client and/or a server that will be involved in remote method call processing associated with the proxy. For example, associating the format sink with the client and/or server may involve processing including, but not limited to, setting a pointer to the format sink, establishing an object reference to a format sink object, passing an entry address associated with the format sink to the client and/or the server and updating a sink chain associated with the client and/or server.

Similarly, at 1180, the channel sink of 1160 may be employed in choosing a transporter (e.g., a transport sink) with which the registered pluggable channel is associated and thus which the registered pluggable channel desires to employ in its interactions with the proxy. At 1185, the chosen transport sink is associated with a client and/or a server that will be involved in remote method call processing associated with the proxy. For example, associating the transport sink with the client and/or server may involve processing including, but not limited to, setting a pointer to the transport sink, establishing an object reference to a transport sink object, passing an entry address associated with the transport sink to the client and/or the server and updating a sink chain associated with the client and/or server.

Thus, the method 1100 illustrated in FIG. 11 facilitates configuring a pluggable channel and associating the pluggable channel with a proxy on a per proxy basis, which provides flexibility and extensibility advantages over conventional systems. Although FIG. 11 illustrates three sinks (e.g., a channel sink, a format sink, a transport sink), it is to be appreciated that a greater or lesser number of sinks may be employed in accordance with the present invention.

FIG. 12 includes a flowchart illustrating a method 1200 for employing a pluggable channel to adapt outbound message processing associated with a remote method call in a distributed object environment. FIG. 12 further illustrates a method 1250 for employing a pluggable channel to adapt inbound message processing associated with a remote method call in a distributed object environment.

The method 1200 can be initiated, for example, by a distributed object system intercepting a method call made on a remote object, where the remote object is imaged by a proxy on a client system. At 1205, general initializations occur. Such initializations include, but are not limited to, allocating memory, establishing pointers, establishing data communications, acquiring resources, instantiating objects, locating data structures and/or objects associated with registered channels and setting initial values for variables.

At 1210, the distributed object system may take the call data (e.g., a call stack) and produce a message object that can passed to a formatter (e.g. a format sink). The distributed object system maybe able to identify to which format sink the message object should be passed based on association processing similar to that described in connection with FIG. 11, for example. The format sink can process the message object (e.g., serialize the data, add protocol headers, add channel information) and at 1215 pass a formatted object, for example, to the next sink in the sink chain (e.g., a security sink).

At 1220, security operations including, but not limited to, authenticating the sender and/or receiver, encrypting/decrypting data and generating and/or responding to security challenges may be performed. Such varied processing may be performed at 1220 because a server may require different levels of identification (e.g., anonymous, identify, impersonate and delegate) and/or may choose different levels of payload security (e.g., integrity (signatures), privacy (encryption)), for example. At 1225, once the security processing of 1220 is substantially complete, the secured object can be passed to a transporter (e.g., a transport sink). At 1230, the transport sink may send the data stream onto a network. It is to be appreciated that different transport sinks may employ different transport protocols since different transport protocols may be appropriate for different purposes. For example, typical transports include Hypertext Transport Protocol HTTP (e.g., for crossing firewalls), Transmission Control Protocol TCP (e.g., for intranet), Simple Mail Transport Protocol SMTP (e.g., for disconnected scenarios) and Microsoft Message Queue MSMQ (e.g., for reliable operation). Conventionally, a channel was capable of processing one protocol. The present invention facilitates associating a desired protocol with a pluggable channel, providing flexibility improvements over conventional systems.

While a formatter (e.g., a format sink), a security processor (e.g., a security sink) and a transporter (e.g., a transport sink) are described in association with method 1200, it is to be appreciated that a greater and/or lesser number of sinks, and sinks of differing identities and/or purposes may be employed in accordance with the present invention.

Concerning the method 1250, at 1255, general initializations occur. Such initializations include, but are not limited to, allocating memory, establishing pointers, establishing data communications, acquiring resources, instantiating objects, locating data structures and/or objects associated with registered channels and setting initial values for variables.

At 1260, a transporter (e.g., a transport sink) receives an inbound data stream. The transporter may perform protocol handling processing including, but not limited to, analyzing protocol headers, analyzing data integrity characters (e.g., block check character, cyclic redundancy check character, checksum) and removing protocol headers and/or trailers. The transport sink may convert the input data stream into an object (e.g., a message object). Thus, at 1265, the object can be passed to a security processor (e.g., a security sink) and at 1270 security operations including, but not limited to, authenticating the sender and/or receiver, encrypting/decrypting data and generating and/or responding to security challenges may be performed. Such varied processing may be performed at 1270 because a client and/or server may require different levels of identification (e.g., anonymous, identify, impersonate and delegate) and/or may choose different levels of payload security (e.g., integrity (signatures), privacy (encryption)), for example.

At 1275, the secured object can be passed to a (de)formatter (e.g., a format sink) where the information in the message can be deserialized, for example. Thus, at 1280, a message object may be passed to an entity like a remoting infrastructure and/or a distributed object environment that can retrieve the message in the message object and provide the data to the consumer of the message.

While a formatter (e.g., a format sink), a security processor (e.g., a security sink) and a transporter (e.g., a transport sink) are described in association with method 1250, it is to be appreciated that a greater and/or lesser number of sinks, and sinks of differing identities and/or purposes may be employed in accordance with the present invention.

Figure 13:
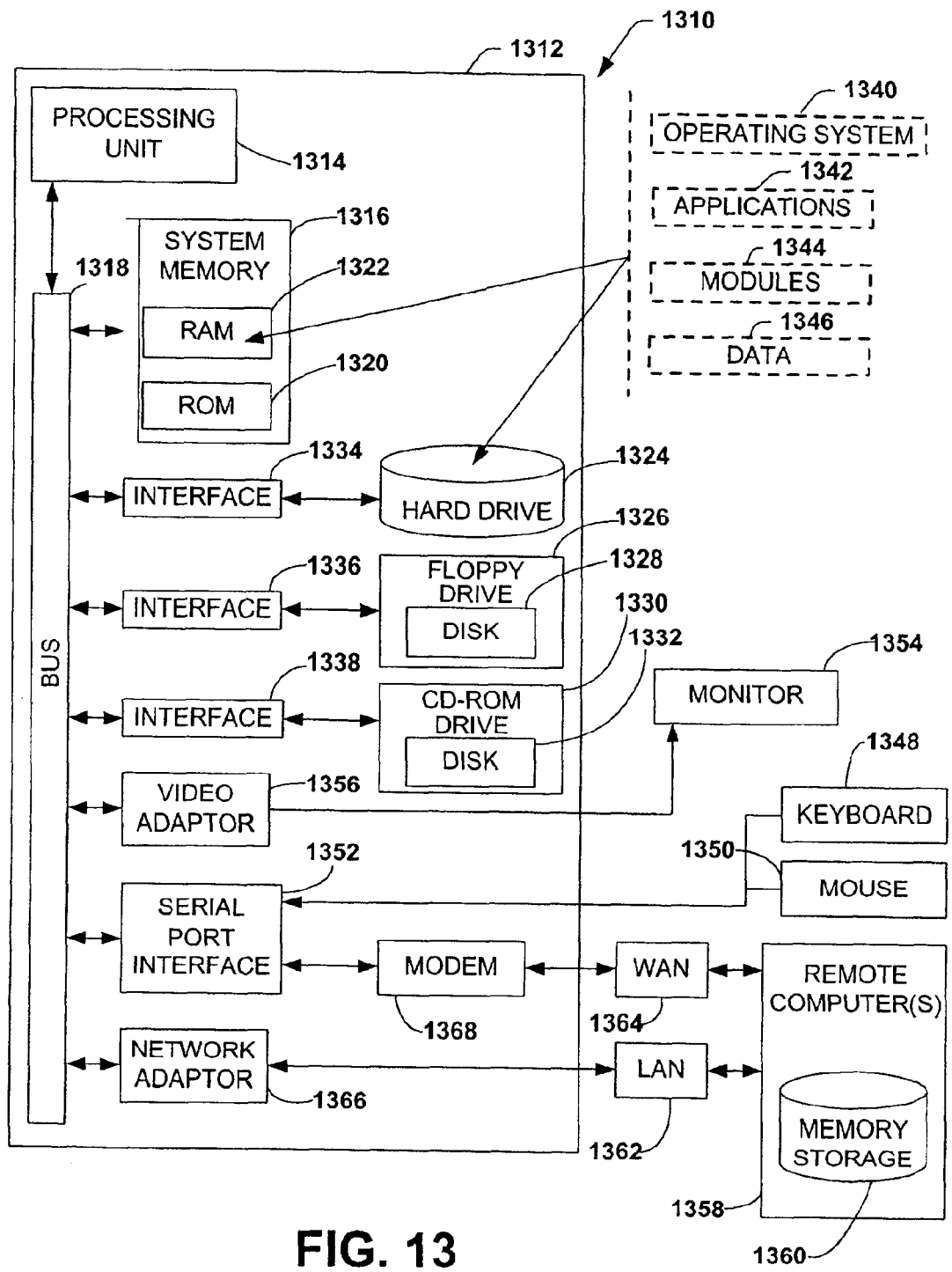
FIG. 13 is a schematic block diagram of an exemplary operating environment for a system configured in accordance with the present invention.

In order to provide additional context for various aspects of the present invention, FIG. 13 and the following discussion are intended to provide a brief, general description of one possible suitable computing environment 1310 in which the various aspects of the present invention may be implemented. It is to be appreciated that the computing environment 1310 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 13 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 13, an exemplary environment 1310 for implementing various aspects of the invention includes a computer 1312, including a processing unit 1314, a system memory 1316, and a system bus 1318 that couples various system components including the system memory to the processing unit 1314. The processing unit 1314 may be any of various commercially available processors. Dual microprocessors and other multi-processor architectures also can be used as the processing unit 1314.

The system bus 1318 may be any of several types of bus structure including a memory bus or memory controller, a peripheral bus, and a local bus using any of a variety of commercially available bus architectures. The computer memory 1316 includes read only memory (ROM) 1320 and random access memory (RAM) 1322. A basic input/output system (BIOS), containing the basic routines that help to transfer information between elements within the computer 1312, such as during start-up, is stored in ROM 1320.

The computer 1312 may further include a hard disk drive 1324, a magnetic disk drive 1326, e.g., to read from or write to a removable disk 1328, and an optical disk drive 1330, e.g., for reading a CD-ROM disk 1332 or to read from or write to other optical media. The hard disk drive 1324, magnetic disk drive 1326, and optical disk drive 1330 are connected to the system bus 1318 by a hard disk drive interface 1334, a magnetic disk drive interface 1336, and an optical drive interface 1338, respectively. The computer 1312 typically includes at least some form of computer readable media. Computer readable media can be any available media that can be accessed by the computer 1312. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1312. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules maybe stored in the drives and RAM 1322, including an operating system 1340, one or more application programs 1342, other program modules 1344, and program non-interrupt data 1346. The operating system 1340 in the computer 1312 can be any of a number of commercially available operating systems.

A user may enter commands and information into the computer 1312 through a keyboard 1348 and a pointing device, such as a mouse 1350. Other input devices (not shown) may include a microphone, an IR remote control, a joystick, a game pad, a satellite dish, a scanner, or the like. These and other input devices are often connected to the processing unit 1314 through a serial port interface 1352 that is coupled to the system bus 1318, but may be connected by other interfaces, such as a parallel port, a game port, a universal serial bus ("USB"), an IR interface, etc. A monitor 1354, or other type of display device, is also connected to the system bus 1318 via an interface, such as a video adapter 1356. In addition to the monitor, a computer typically includes other peripheral output devices (not shown), such as speakers, printers etc.

The computer 1312 may operate in a networked environment using logical and/or physical connections to one or more remote computers, such as a remote computer(s) 1358. The remote computer(s) 1358 may be a workstation, a server computer, a router, a personal computer, microprocessor based entertainment appliance, a peer device or other common network node, and typically includes many or all of the elements described relative to the computer 1312, although, for purposes of brevity, only a memory storage device 1360 is illustrated. The logical connections depicted include a local area network (LAN) 1362 and a wide area network (WAN) 1364. Such networking environments are commonplace in offices, enterprise-wide computer networks, intranets and the Internet.

When used in a LAN networking environment, the computer 1312 is connected to the local network 1362 through a network interface or adapter 1366. When used in a WAN networking environment, the computer 1312 typically includes a modem 1368, or is connected to a communications server on the LAN, or has other means for establishing communications over the WAN 1364, such as the Internet. The modem 1368, which may be internal or external, is connected to the system bus 1318 via the serial port interface 1352. In a networked environment, program modules depicted relative to the computer 1312, or portions thereof, may be stored in the remote memory storage device 1360. It will be appreciated that the network connections shown are exemplary and other means of establishing a communications link between the computers may be used.

Figure 14:
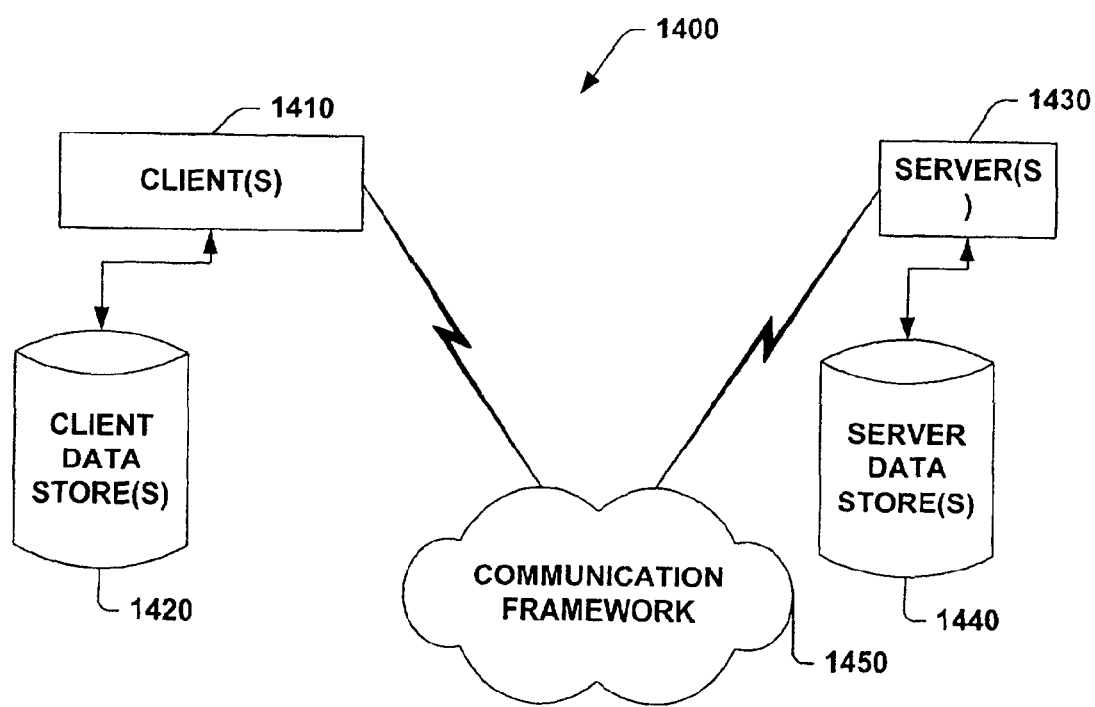
FIG. 14 is a schematic block diagram of an exemplary communication environment for a method performing in accordance with the present invention.

FIG. 14 is a schematic block diagram of a sample computing environment 1400 with which the present invention may interact. The system 1400 includes one or more clients 1410. The clients 1410 may be hardware and/or software (e.g., threads, processes, computing devices). The system 1400 also includes one or more servers 1430. The servers 1430 may also be hardware and/or software (e.g., threads, processes, computing devices). The clients 1410 may house one or more proxies that can be employed, in a distributed object environment, to image server objects housed on the servers 1430.

The system 1400 includes a communication framework 1450 that can be employed to facilitate communications between the clients 1410 and the servers 1430. The clients 1410 are operably connected to one or more client data stores 1415 that can be employed to store information local to the clients 1410 (e.g., configured pluggable channels, sink chains). Similarly, the servers 1430 are operably connected to one or more server data stores 1440 that can be employed to store information local to the servers 1430 (e.g., registered pluggable channels, configured pluggable channels, sink chains).

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to facilitate customizing a channel, the method comprising:

registering one or more pluggable channels;

intercepting a method call made on a remoted object;

determining whether one of the one or more registered channels desires to customize data communications associated with the method call on the remoted object;

creating a channel sink associated with the registered pluggable channel;

choosing one or more data communication processes implemented by one or more sinks to associate with the channel sink;

associating the one or more sinks with the channel sink; and processing data associated with the method call on the remoted object through the one or more sinks associated with the channel sink.

2. The method of claim 1 where determining whether one of the one or more registered channels desires to customize data communications associated with the method call on the remoted object comprises:

when a proxy is created, examining one or more registered pluggable channels to determine whether they desire to customize data communications associated with the proxy.

3. The method of claim 1 where choosing one or more data communication processes to associate with the channel sink comprises:

identifying one or more client side data communication processes associated with a registered channel;

identifying one or more server side data communication processes associated with a registered channel; and choosing one or more of the client side data communication processes and/or one or more of the server side data communication processes.

4. The method of claim 1, where associating the one or more sinks with the channel sink comprises:

creating a sink chain, where the sink chain comprises an ordered set of the one or more sinks; and binding the sink chain to a proxy that images the remoted object.

5. The method of claim 2 where choosing one or more data communication processes to associate with the channel sink comprises:

identifying one or more client side data communication processes associated with a registered pluggable channel;

identifying one or more server side data communication processes associated with a registered pluggable channel; and choosing one or more of the client side data communication processes and/or one or more of the server side data communication processes.

6. The method of claim 5, where associating the one or more sinks with the channel sink comprises:
creating a sink chain, where the sink chain comprises an ordered set of the one or more sinks; and
binding the message sink to a proxy that images the remoted object.

7. A computer readable medium containing computer executable instructions operable to perform a method to facilitate customizing a pluggable channel, the method comprising:
registering one or more pluggable channels;
intercepting a method call made on a remoted object;
determining whether one of the one or more registered channels desires to control data communications associated with the method call on the remoted object;
creating a channel sink associated with the registered pluggable channel;
choosing one or more data communication processes implemented by one or more sinks to associate with the channel sink;
associating the one or more sinks with the channel sink; and
processing data associated with the method call on the remoted object through the one or more sinks associated with the channel sink.

8. A system that facilitates making channels pluggable, the system comprising:
means for registering a channel;
means for intercepting a method call made on a server object;
means for determining whether a registered channel will control data communications associated with the method call on the server object;
means for creating a channel sink;
means for selecting data communication processes to associate with the channel sink;
means for associating the data communication processes with the channel sink; and
means for processing data associated with the method call on the server object through the data communication processes associated with the channel sink.

9. A data packet adapted to be transmitted between two components, the data packet comprising:
a first field adapted to hold information concerning a method call on a server object;
a second field adapted to hold information concerning a channel sink associated with processing the information concerning the method call on the server object; and
a third field adapted to hold information concerning one or more data communication processes associated with the channel sink.

10. A system that facilitates adapting a communication associated with a remote method call in a distributed object environment, the system comprising:
at least one of:
at least one customizable formatter adapted to format data associated with a method call made on a remote object, where the method call is intercepted by the distributed object system and where the customizable formatter may be plugged into a pluggable channel;
at least one customizable security processor adapted to perform security processing on data associated with the method call made on the remote object, where the customizable security processor may be plugged into the pluggable channel;
at least one customizable transporter adapted to transport data associated with the method call made on the remote object between a caller and a callee, where the customizable transporter may be plugged into the pluggable channel; and
at least one user sink; and
a selector adapted to facilitate choosing at least one of a customizable formatter, a customizable security processor and a customizable transporter to process data associated with the method call.

11. The system of claim 10 where at least one of the formatter, the security processor and the transporter is a programmatic object that can be programmed by a user of the system.

12. The system of claim 11, where at least one of the formatter, the security processor and the transporter implement one or more an object-oriented interfaces that facilitate interacting with the distributed object environment.

13. The system of claim 12, where at least one of the formatter, the security processor and the transporter has a client component.

14. The system of claim 13, where at least one of the formatter, the security processor and the transporter has a server component.

15. A system that facilitates controlling a data communication associated with a remote method call, the system comprising:
a pluggable channel, adapted to interact with one or more sinks, the pluggable channel further adapted to interact with a communication infrastructure; and
a selector, operable to choose one or more sinks to employ to perform processing associated with the data communication, the selector further operable to associate the one or more sinks with the pluggable channel.

16. The system of claim 15, where the data communication associated with the remote method call occurs between a client and a server in a distributed object system.

17. The system of claim 16, where the one or more sinks comprise at least one of a channel sink, a format sink, a transport independent sink, a user sink, a security sink and a transport sink.

18. The system of claim 17, where at least one of the one or more sinks is a programmatic object that can be programmed by a user of the at least one sink.

19. The system of claim 17, where one or more sinks may be associated with a pluggable channel on a per proxy basis.

20. The system of claim 19, where the selector selects sinks to associate with the pluggable channel by examining registered pluggable channels.

21. The system of claim 18, where at least one of the one or more sinks has a client component.

22. The system of claim 18 where the one or more sinks implement one or more object-oriented interfaces that facilitate the one or more sinks interacting with the communication infrastructure and/or other sinks.

23. The system of claim 21, where at least one of the one or more sinks has a server component.

24. A system that facilitates adapting a communication associated with a remote method call in a distributed object system, the system comprising:
a formatter adapted to format data associated with a method call made on a remote object, where the method call is intercepted by the distributed object system; and
a selector adapted to facilitate choosing a formatter to process data associated with the method call, the selector further adapted to associate the formatter with a proxy object that images the remote object.

25. The system of claim 24, where the formatter may be plugged into a pluggable channel.

26. The system of claim 25, where the formatter is a programmatic object that can be programmed by a user of the formatter.

27. The system of claim 26, where the formatter implements an object-oriented interface that facilitates interacting with the distributed object system.

28. The system of claim 27, where the formatter has a client component.

29. The system of claim 28, where the formatter has a server component.

30. A system that facilitates adapting a communication associated with a remote method call in a distributed object system, the system comprising:
   a security processor adapted to perform security processing on data associated with a method call made on a remote object, where the method call is intercepted by the distributed object system; and
   a selector adapted to facilitate choosing a security processor to process data associated with the method call, the selector further adapted to associate the security processor with a proxy object that images the remote object.

31. The system of claim 30, where the security processor may be plugged into a pluggable channel.

32. The system of claim 31, where the security processor is a programmatic object that can be programmed by a user of the security processor.

33. The system of claim 31, where the security processor implements an object-oriented interface that facilitates interacting with the distributed object system.

34. The system of claim 33, where the security processor has a client component.

35. The system of claim 34, where the security processor has a server component.

36. A system that facilitates adapting a communication associated with a remote method call in a distributed object system, the system comprising:
   a transporter adapted to transport data associated with a method call made on a remote object, where the method call is intercepted by the distributed object system; and
   a selector adapted to facilitate choosing a transporter to transport data associated with the method call, the selector further adapted to associate the transporter with a proxy object that images the remote object.

37. The system of claim 36, where the transporter may be plugged into a pluggable channel.

38. The system of claim 37, where the transporter is a programmatic object that can be programmed by a user of the transporter.

39. The system of claim 38, where the transporter implements an object-oriented interface that facilitates interacting with the distributed object system.

40. The system of claim 39, where the transporter has a client component.

41. The system of claim 40, where the transporter has a server component.

42. A computer readable medium containing computer executable components of a system that facilitates customizing a component to component communication associated with a remote method call in a distributed object environment, the system comprising:
   a pluggable channel component, adapted to interact with one or more sink components, the pluggable channel component further adapted to interact with the distributed object environment; and
   a selector component, operable to choose one or more sink components to associate with the computer communication, the selector component further operable to associate the one or more sink components with the pluggable channel component.

* * * * *